United States Patent [19]

Schmid

[11] Patent Number: 4,768,904

[45] Date of Patent: Sep. 6, 1988

[54] APPARATUS FOR BROACHING CYLINDRICAL SURFACES OF A WORKPIECE, IN PARTICULAR OF A CRANKSHAFT

[75] Inventor: Karl-Heinz Schmid, Nuertingen-Oberensingen, Fed. Rep. of Germany

[73] Assignee: Gebr. Heller Maschinenfabrik Gesellschaft mit beschraenkter Haftung, Nuertingen, Fed. Rep. of Germany

[21] Appl. No.: 906,821

[22] Filed: Sep. 12, 1986

[30] Foreign Application Priority Data

Sep. 12, 1985 [DE] Fed. Rep. of Germany ....... 3532538

[51] Int. Cl.[4] ............................................. B23D 37/14
[52] U.S. Cl. ......................................... 409/262; 82/9; 409/199; 409/268
[58] Field of Search ............... 409/199, 200, 262, 268, 409/282; 82/9; 407/12

[56] References Cited

U.S. PATENT DOCUMENTS

| 549,109 | 11/1895 | Crombie | 82/9 X |
|---|---|---|---|
| 2,090,119 | 8/1937 | Groene et al. | 409/268 |
| 2,126,462 | 8/1938 | Groene et al. | 82/9 X |
| 2,128,625 | 8/1938 | Vaughn | 82/9 X |
| 2,280,229 | 4/1942 | Groene et al. | 409/268 X |
| 2,468,745 | 5/1949 | Garand | 407/12 |
| 2,553,966 | 5/1951 | Groene | 82/9 X |
| 4,326,323 | 4/1982 | Kralowetz et al. | 409/200 X |
| 4,494,280 | 1/1985 | Blaimschein | 409/199 X |
| 4,564,323 | 1/1986 | Berbalk | 409/200 |

FOREIGN PATENT DOCUMENTS

| 1800065 | 5/1970 | Fed. Rep. of Germany . |
| 3340830 | 5/1985 | Fed. Rep. of Germany . |

Primary Examiner—Z. R. Bilinsky
Attorney, Agent, or Firm—Foley & Lardner, Schwartz, Jeffery, Schwaab, Mack, Blumenthal & Evans

[57] ABSTRACT

Apparatus for broaching a cylindrical surface of a workpiece, in which at least one broaching tool is mounted on a tool carrier rotatable about its axis and about the axis of the cylindrical surface of the workpiece clamped in a stationary position. The broaching tool is independently rotatable about its own axis, and the rotary motion of the tool is superimposed on the rotation of the carrier and consequently the revolving motion of the broaching tool. Since the workpiece is stationary during broaching, very high cutting speeds can be achieved. The broaching tool can be of small and lightweight construction so that it is especially suitable for an automatic tool change. In a preferred form, a plurality of broaching tools are utilized, the axes of which are spaced outwardly from and circumferentially about the axis of the workpiece.

8 Claims, 7 Drawing Sheets

APPARATUS FOR BROACHING CYLINDRICAL SURFACES OF A WORKPIECE, IN PARTICULAR OF A CRANKSHAFT

BACKGROUND OF THE INVENTION

The invention relates to an apparatus for broaching cylindrical surfaces of a workpiece, for example, bearing journals, and in particular crankshafts.

Prior Art

In German Offenlegungsschrift No. 1,800,065, the workpiece to be machined and the broaching tool are each rotated about their axis during machining. The rotation of the workpiece at the same time determines the cutting speed. In order to obtain cutting speeds which are optimum with regard to chip removal, the workpiece ought to be rotated at a relatively high speed during machining, as a result of which, however, considerable unbalance is produced, in particular when the crankpin bearings of a crankshaft are machined. Such workpieces cannot therefore be optimally machined with this device.

In another known machine disclosed in German Offenlegungsschrift No. 3,340,830, the workpiece, for example a crankshaft, is likewise rotated by means of the clamping device during machining. The broaching tools are pushed linearly past the crankshaft, rotating at machining cutting speed by means of the work carrier. In order to achieve the infeed movement, the cutting parts of the broaching tool are arranged in ascending manner one after the other against the feed direction of the work carrier or the broaching tool. Here, too, the crankshaft is rotated at a relatively high speed during machining, as a result of which considerable unbalance is produced, in particular when the crankpin bearings of the crankshaft are machined. For this reason, the machine is not able to produce a cutting speed which is optimum with regard to chip removal.

SUMMARY OF THE INVENTION

The object of the invention is to provide an apparatus for broaching cylindrical surfaces of a workpiece in such a way that no allowance need be made during machining for its unbalance. Due to its simple and compact design, the invention permits high cutting speeds to be achieved, with long tool lives, during the machining of the workpieces. The machining time is also correspondingly reduced.

In accordance with the invention, the workpiece to be machined is firmly clamped in a clamping device and is stationary during broaching. For broaching, the tool carrier is rotated about its axis which at the same time corresponds to the axis of the cylindrical workpiece surface to be machined. The broaching tool arranged on the tool carrier is driven along during this rotary motion of the tool carrier and thus revolves around the axis of the tool carrier. This revolving motion of the broaching tool or the rotary motion of the tool carrier determines the cutting speed. It can be very high, because no allowance need be made for the unbalance of the stationary workpiece to be machined. During this revolving motion, the broaching tool is at the same time rotated about its own axis. The feed during broaching of the cylindrical surface of the workpiece is determined by the rotary motion of the broaching tool superimposed on the revolving motion. The device can be of compact design as a result of these rotary motions of the tool carrier and the broaching tool. The broaching tool can be of small and lightweight construction, so that it is especially suitable for an automatic tool change. Since the broaching tool rotates about its own axis, the cutting parts of the broaching tool can be designed in such a way that the cutting parts coming into engagement with the cylindrical surface of the workpiece at the end of broaching have the profile to be made on the workpiece. In addition, the last cutting edges can be designed as finished cutting edges so that the cylindrical surface can be finish machined to such an extent that only fine machining, such as grinding and the like, has to follow.

Further features of the invention will be apparent from the description which follows.

BRIEF DESCRIPTION OF THE APPLICATION DRAWINGS

The invention is described in greater detail with reference to the application drawings, in which.

DETAILED DESCRIPTION OF THE PREFERRED EMBODIMENT

Figure 1:
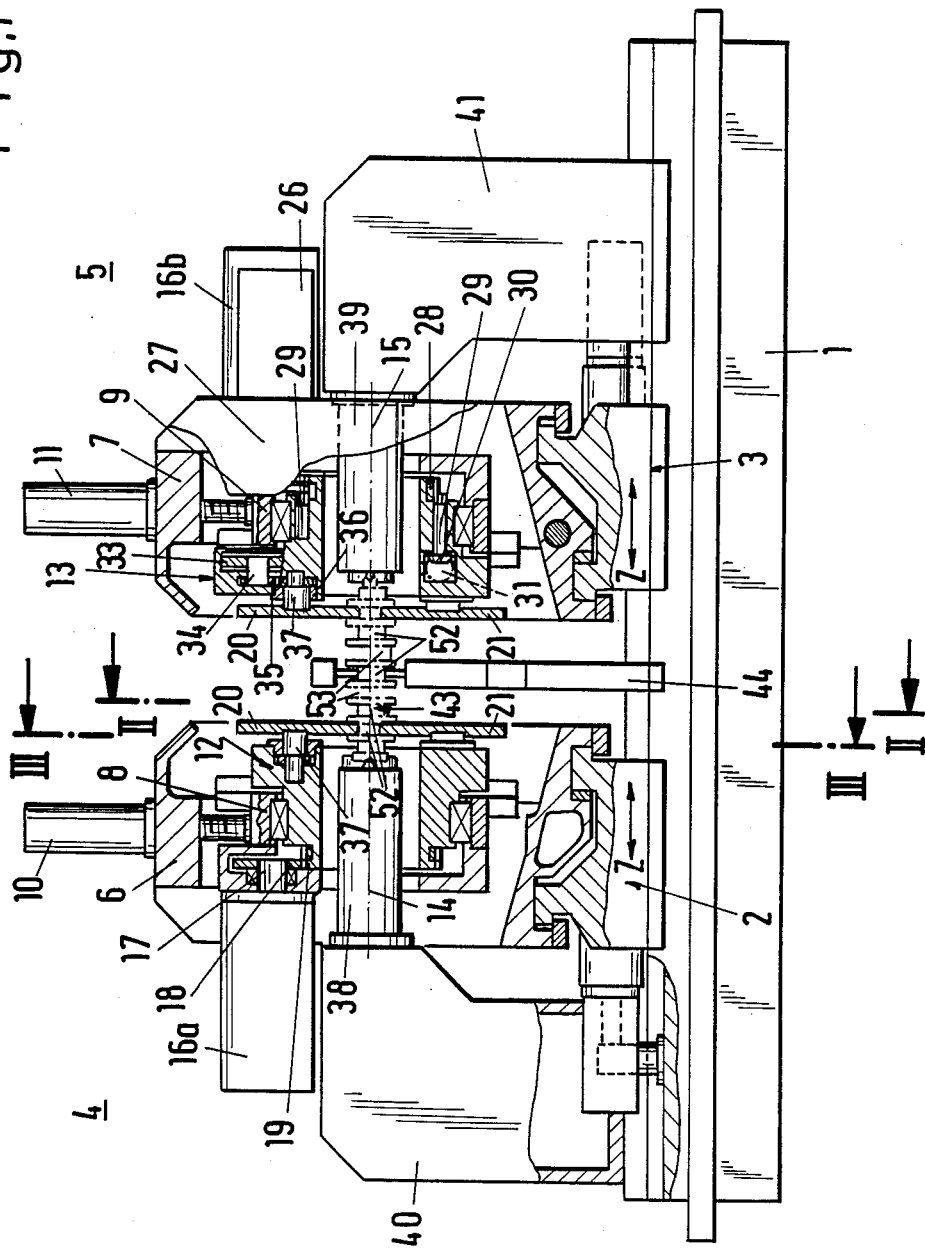
FIG. 1 is a side elevational view, partly in section, of a first embodiment according to the invention.
Figure 2:
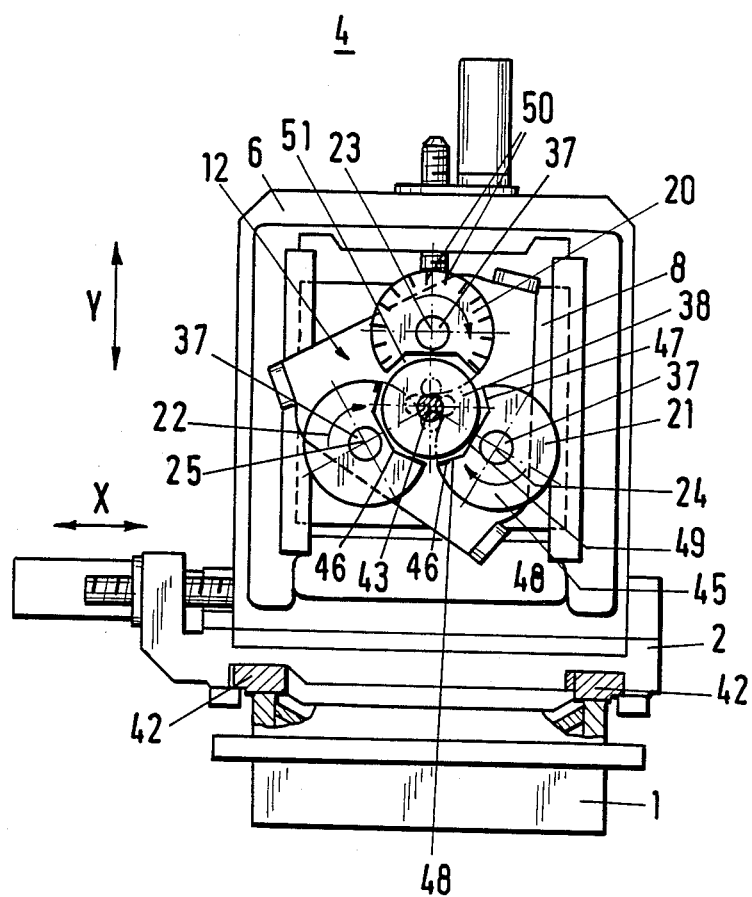
FIG. 2 is an end view, partly in section, of the embodiment of FIG. 1, taken along line II—II of FIG. 1.
Figure 3:
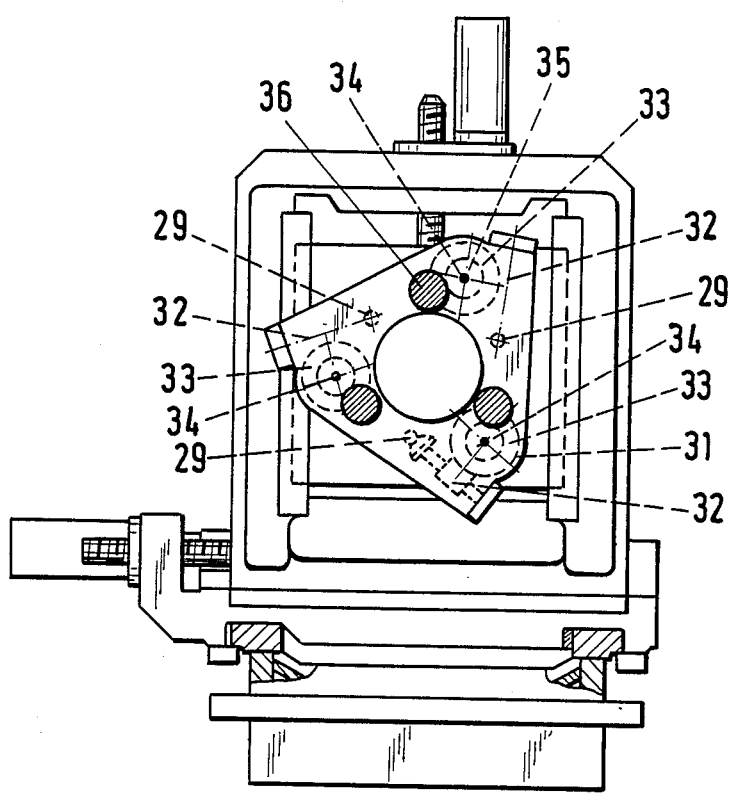
FIG. 3 is a partially sectional view taken along line III—III of FIG. 1.

The apparatus according to the embodiment of FIGS. 1-3 is used for machining the main and crankpin bearings of crankshafts, and includes a bed 1 on which two cross slides 2 and 3 of two machining units 4 and 5 can be moved in the Z direction. The cross slides 2 and 3 support columns 6 and 7, respectively, which can be adjusted in the X direction (FIG. 2) on the cross slide. Each column 6 and 7 supports a slide 8 and 9 which can be adjusted in the Y direction (FIG. 2) by means of drives 10 and 11. Thus, the slides 8 and 9 can be set in every desired position in the three directions which are perpendicular to one another.

Each of the slides 8 and 9 support a tool carrier 12 and 13, respectively, which are rotatably driven about axes 14 and 15 which lie in the Z direction and which, in the representation according to FIG. 1, coincide with the main bearing axis of the crankshaft 43 to be machined. For the rotary drive of the tool carriers 12 and 13, drive motors 16a and 16b, respectively, are provided on the slides 8 and 9. Gears 18, only one of which is visable in FIG. 1, are positioned on the drive shafts 17 of the drive motors 16a and 16b, which gears 18 engage in revolving toothing 19 of the tool carriers 12 and 13. Thus, the tool carriers 12 and 13 are driven in a rotating manner about the axes 14 and 15 by the motors 16a and 16b.

Provided on the tool carriers 12 and 13 in a distributed manner over the periphery are three broaching tools 20, 21 and 22 (FIG. 2) which in each case are driven in a rotating manner about axes 23, 24 and 25, respectively. For driving the broaching tools 20–22, drives 26 are arranged on slides 8 and 9, with only the drive 26 for the machining unit 5 being shown in FIG. 1. The machining unit 4 has an identical drive. The drive shafts of drives 26 interact with superimposed gearing 27, known per se. An additional rotary motion of the broaching tools 20–22 is therefore superimposed via the drives 26 on the rotary motion of the tool carriers 12 and 13. In other words, the broaching tools 20–22, apart from their revolving motion about the axes 14 and 15, also execute rotary motions about their own axes 23–25, respectively. An annular gear 28 (FIG. 1) lying in an annular groove of each of the tool carriers 12 and 13 is rotatably driven by the superimposed gearing 27. The annular gear 28 therefore rotates relative to the tool carriers 12 and 13. Three intermediate shafts 29 (FIG. 3) engage the annular gear 28, which is freely rotatable with respect to the tool carriers 12 and 13, which intermediate shafts 29 are allocated to the three broaching tools 20–22 (FIGS. 1 and 3). The intermediate shafts 29 are in each case connected in a driven manner through bevelled gearing 30 and 31 (FIGS. 1 and 3) to a worm 32 which is rotatably mounted in the tool carriers 12 and 13. In FIG. 3, two of the three worms 32 are identified by their axes. The worms 32 mesh with a worm gear 33, the shaft 34 of which is connected in a driven manner to the shafts 37 of the broaching tools 20–22 through toothed gearing 35 and 36. The worm gearing 32 and 33, the shafts 34 and 37, and also the toothed gearing 35 and 36 are rotatably mounted in the tool carriers 12 and 13.

The tool carriers 12 and 13 are provided with central openings through which chucks 38 and 39 of headstocks 40 and 41, respectively, extend. Just like the cross slides 2 and 3, the headstocks 40 and 41 can be adjusted on guides 42 of the bed 1 (FIG. 2), which guides 42 run in the Z direction. The ends of the crankshaft 43 (FIG. 1) to be machined are clamped into the two chucks 38 and 39 of the machining units 4 and 5. The headstocks 40 and 41 can be adjusted independently of the cross slides 2 and 3. The adjustability of the headstocks 40 and 41 is necessary to be able to clamp shorter or longer workpieces.

The broaching tools 20–22 in each case have a disk-shaped cutting part carrier 45 (FIG. 2) which is provided with a recess 46 defined by approximately radially running side walls 47 and 48 and a base 49 which connects the side walls 47 and 48 and runs parallel to an axial plane of the cutting part carrier. The side walls 47 and 48 extend to the periphery of the cutting part carrier 45. In the peripheral area between the side walls 47 and 48, the broaching cutters 50 (not shown in detail) are mounted in the periphery of the cutting part carrier 45. The cutting edges of the broaching cutters 50, arranged one behind the other in the peripheral direction, lie on a spiral ascending in the rotary direction of the broaching tools 20–22.

Crankshafts for single-cylinder and multi-cylinder machines can be advantageously machined with the apparatus according to FIGS. 1–3. In the initial position, the cutting part carriers 45 of the broaching tools 20–22 assume the mutual position shown in FIG. 2. The recesses 46 are situated so that they define a central opening 51 (FIG. 2) for the passage of the crankshaft 43.

For clamping the crankshaft 43 to be machined, the broaching tools 20–22 are moved apart by means of the cross slides 2 and 3 and columns 6 and 7. At the same time, the chucks 38 and 39 can pass through the central openings 51 of the two machining units 4 and 5. The crankshaft 43 can then easily be clamped into the chucks 38 and 39. In addition, the crankshaft 43 is centrally clamped with the clamping device 44 located between the two machining units 4 and 5. The machining units 4 and 5 are then advanced again by means of the cross slides 2 and 3 until the broaching tools 20–22 move into the machining area of the crankshaft 43. The broaching tools 20–22 can easily be aligned relative to the main and crankpin bearings of the crankshaft 43 to be machined by the described adjustment in the X, Y, and Z directions. In the FIGS. 1–3 embodiment, the crankshaft 43 has four crankpin bearings 52 and main bearings 53 located between them. In the position according to FIG. 1, the broaching tools 20–22 machine the first and last main bearings 52 of the crankshaft 43. Since the broaching tools 20–22 of the two machining units 4 and 5 in each case lie in the same plane, all broaching tools of each machining unit machine the same main bearing 52. Once the main bearing is finish machined, the slides 8 and 9 and the columns 6 and 7 are, if necessary, moved into the basic position according to FIG. 2, so that the columns 6 and 7 together with the broaching tools 20–22 can be moved to the next bearing to be machined, which is then machined in the same way. When the slides 8 and 9 are being moved, the cutting part carriers 45 of the broaching tools 20–22 again assume their withdrawn position shown in FIG. 2. In this way, the various bearings of the crankshaft 43 can be machined one after the other. If necessary, the clamping device 44 is likewise adjusted, so that the crankshaft 43 is supported between its ends at another location during machining.

During machining, the crankshaft 43 is fixed and therefore does not rotate about its axis. During machining, the tool carriers 12 and 13 are rotatably driven about their axes 14 and 15 by means of the motors 16a and 16b. In this way, the broaching tools 20–22 revolve around these rotary axes 14 and 15. This revolution of the broaching tools 20–22 due to the rotation of the tool carriers 12 and 13 determines the cutting speed. In addition, during their revolution, the broaching tools 20–22 are rotated about their axes 23–25 by means of the drives 26. The feed of the broaching tools 20–22 is determined by this rotary motion of the broaching tools 20–22 which is superimposed on the revolving motion. Since the crankshaft 43 is firmly clamped and stationary during machining, the cutting speed is not limited by unbalance of the crankshaft 43. Consequently, very high cutting speeds can be achieved, so that quick machining of the crankshaft is possible. Since several tools 20–22 of the same type are used, a very high material-removal capacity is achieved. In particular, the chip lengths advantageously become smaller. As a result of the broaching tools 20–22 contacting the crankshaft in a uniformly distributed manner at the periphery, the deflection forces at the crankshaft are mutually canceled. As a result of the cross slide mounting of the apparatus in the X and Y axis, every type of crankshaft can be machined in the same set-up, because the rotary axes 14 and 15 of the tool carriers can be set to each axis of the crankshaft journals. Since the cutting part carriers 45 of the broaching tools 20–22 are provided with the segment-like recess 46, the broaching tools 20–22 do not have to be reset after the respective machining so that very short non-productive times result. Very small and light broaching tools can be used which are inexpensive and permit an automatic tool change in a simple manner. In addition, an accumulation in the chip production can be avoided by appropriately coordinating the engagement of the cutting parts of the broaching tools 20-22. Since the tool carriers 12 and 13 are provided with hollow centers through which the chucks 38 and 39 can extend, the compact design of the device is increased even further. The gearing between the drives 26 and the broaching tools 20-22 is likewise accommodated in a space-saving manner in the tool carriers 12 and 13.

Figure 4:
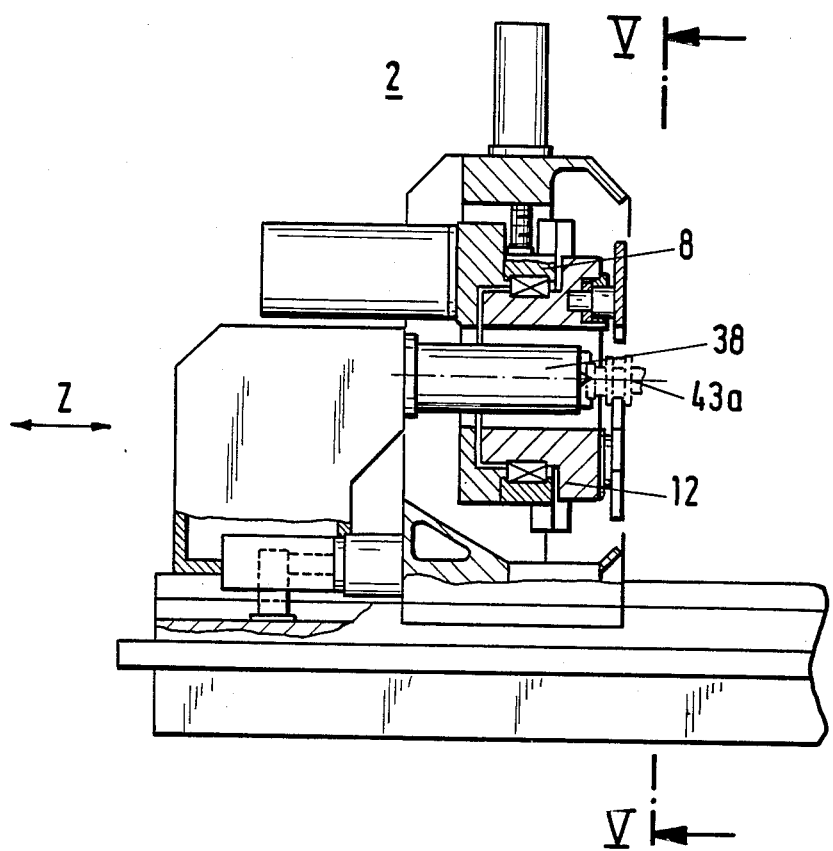
FIG. 4 is a side elevational view, partly in section, of a second embodiment of the invention, with which the main and the crankpin bearings of a crankshaft for a two-cylinder or four-cylinder machine can be machined.
Figure 5:
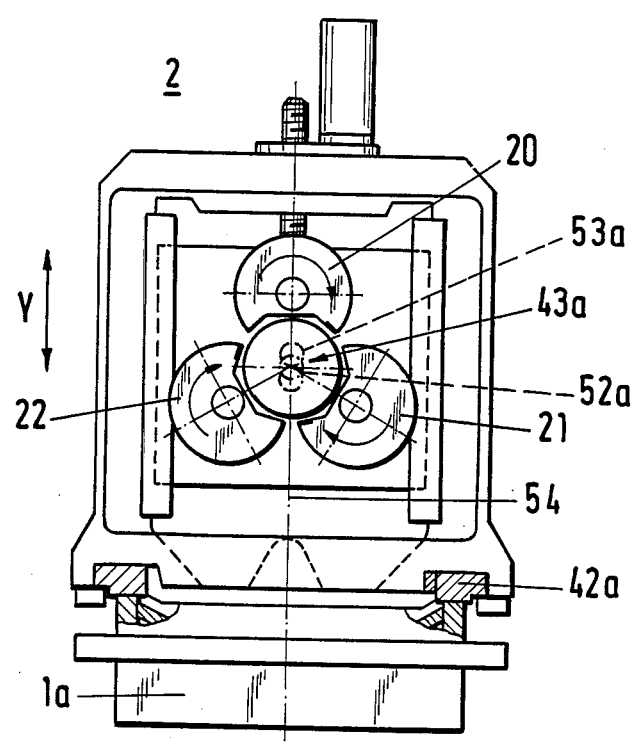
FIG. 5 is an end view taken along line V—V of FIG. 4.

The crankshafts of two-cylinder or four-cylinder machines can be machined with the embodiment according to FIGS. 4 and 5. In this embodiment, the crankshaft 43a, and the axes of the crankpin bearings 53a and the main bearings 52a lie in a common plane 54. The crankshaft 43a can therefore be clamped in the chucks 38 and 39 in such a way that the axes of these bearings 52a and 53a lie in a common vertical plane (FIG. 5). Consequently, the adjusting possibility in the X direction of the slides 8 and 9 can be dispensed with. The columns 6 and 7 can be displaced in the Z direction directly on the guides 42a (FIG. 5) of the bed 1a. Otherwise, this device is of the same design as the embodiment described above with reference to FIGS. 1-3. In FIG. 4, only one of the two machining units is shown, and it will be understood that the other unit is of similar construction.

For machining the crankshaft 43a, which is clamped with its ends in the chucks 38 and 39 as previously described, and, if necessary, is supported centrally with the clamping device 44 (not shown), the crankpin and main bearings 52a and 53a of the crankshaft are machined one after the other. By displacing the machining units 2 and 3 in the Z direction and adjusting the slides 8 and 9 in the Y direction, the broaching tools 20-22 are aligned exactly opposite the bearings to be machined. By rotating the tool carriers 12 and 13 about their axes and simultaneously rotating the broaching tools 20-22 about their own axis, the revolving motion of the tools is superimposed on the rotary motion of the carriers. The machining sequence takes place in the same manner as has been described with reference to the FIGS. 1-3 embodiment. Since the axes of the crankpin and main bearings 52a and 53a to be machined lie in the vertical plane 54, the slides 8 and 9 simply need to be adjusted in an appropriate manner only in the Y direction and the machining units 2 and 3 in the Z direction.

Figure 6:
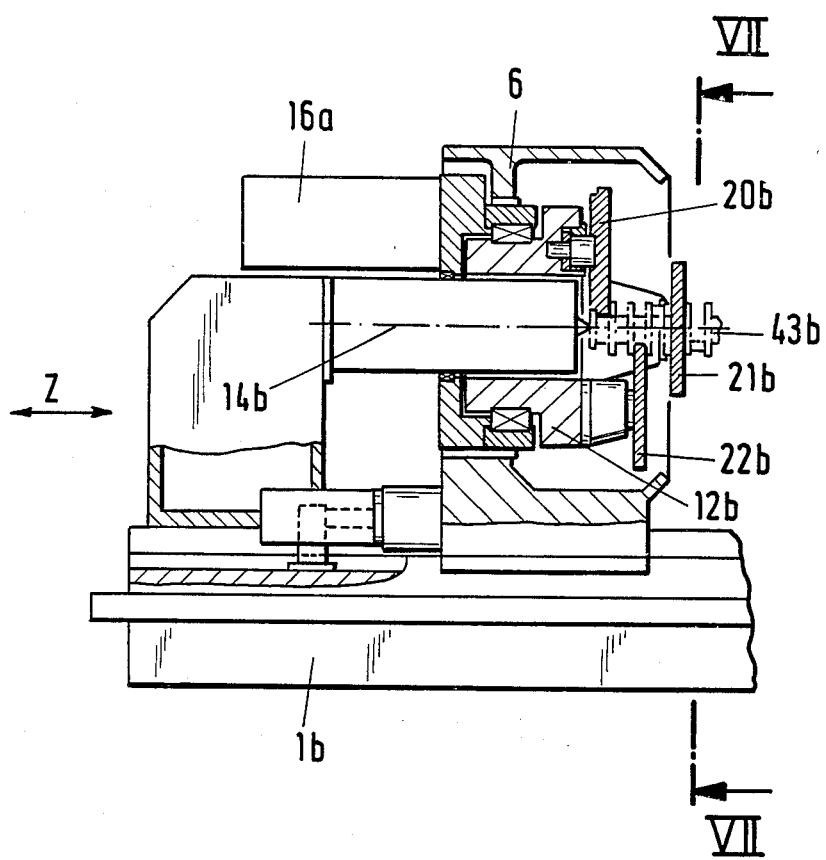
FIG. 6 is a side elevational view, partly in section, of a third embodiment according to the invention, with which only the main bearings of a crankshaft are machined.
Figure 7:
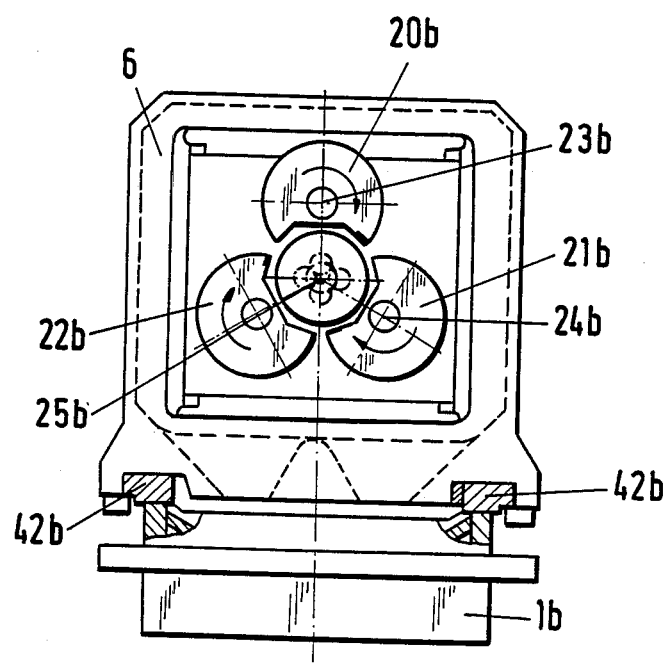
FIG. 7 is an end view taken along line VII—VII of FIG. 6.

The embodiment according to FIGS. 6 and 7 is provided for machining only the main bearings of a crankshaft. Since the axes of the main bearings of the crankshaft lie in a common plane, their main bearings can be machined simultaneously. For this reason, the broaching tools 20b, 21b, and 22b of this embodiment, in contrast to the embodiments described above, are arranged in various planes (FIG. 6). As shown by FIG. 7, the axes 23b-25b of the broaching tools 20b-22b, respectively, as viewed in the axial direction, are arranged in the apexes of an imaginary triangle just as in the previous embodiments. The tool carrier 12b is rotatably driven about its axis 14b by means of the drive 16a. In this connection, the broaching tools 20b-22b mounted on the tool carrier 12b are driven along, as described above, by the latter. A rotary motion is again superimposed on this revolving motion of the broaching tools. The axial distance between the broaching tools 20b-22b is selected in such a way that they can machine three main bearings of the crankshaft simultaneously. In this embodiment, provision is made for only one adjustment in the Z direction by the column 6 being displaceable on the guides 42b of the bed 1b. Otherwise, this embodiment corresponds to the embodiment according to FIGS. 1-3. In FIG. 6, as in FIG. 4, only one of the two machining units is shown.

In all embodiments, the revolution of the broaching tools about the axis of the tool carrier determines the cutting speed, whereas the feed is determined by rotation of the broaching tools about their axes during the revolution. In the embodiments described and shown, two machining units are provided in each case, so that the clamped crankshafts can be machined simultaneously from both ends. It is also possible to provide only one machining unit and to provide simply one headstock opposite this machining unit, so that the crankshaft can be clamped at both ends. In this case, the stationary crankshaft is only machined from one end.

The side webs of the crankshafts can also be machined with the devices described. In this connection, the material is removed from the workpiece radially from outside to inside. A cylindrical surface is therefore machined in this case too.

Instead of the crankshafts, other workpieces can also be machined with the devices provided the workpieces have a cylindrical surface to be machined.

What is claimed is:

1. Apparatus for broaching cylindrical surfaces of a workpiece such as, for example, a crankshaft, comprising:
    means for clamping the workpiece to be machined, said workpiece being held stationary during the broaching process;
    a tool carrier adapted to carry tools and to be mounted for rotation about an axis relative to the cylindrical surface of the workpiece;
    first drive means for rotating said tool carrier, said first drive means determining the cutting speed of the tools;
    a plurality of broaching tools mounted on said carrier for rotation therewith, each of said broaching tools being so shaped that when said tools are in a withdrawn position, a central opening is formed having a dimension greater than the effective diameter of the workpiece so as to permit movement of said tools axially relative to said stationary workpiece;
    a shaft mounting each of said broaching tools for rotation about the axis of each shaft, the axes being positioned radially outwardly from and about the axis of rotation of said tool carrier, and
    means for rotating each of said broaching tools about its own axis independently of the rotation of said tool carrier, the rotation of said broaching tools controlling the feed and being superimposed on the rotating motion of said tool carrier thereby permitting very high cutting speeds to be achieved.

2. The apparatus as claimed in claim 1 wherein said tool carrier is formed with a central opening through which projects said clamping means.

3. The apparatus as claimed in claim 1 wherein said second drive means for rotating said tools comprises a rotary drive operatively connected to said shafts of said broaching tool through a superimposed gearing.

4. The apparatus as claimed in claim 1, wherein said second drive means comprises a single rotary drive for simultaneously rotating all of said broaching tools.

5. The apparatus as claimed in claim 1, wherein said broaching tools lie in a common plane perpendicular to the axis of the workpiece.

6. The apparatus as claimed in claim 1, wherein said broaching tools lie in various planes perpendicular to the axis of said workpiece.

7. The apparatus as claimed in claim 1, wherein said broaching tools are generally disc-shaped, with each tool being provided with a segment-shaped recess extending to the periphery of the tool, the collective recesses of said tools, in an initial withdrawn position of the broaching tools, forming a central opening having a dimension greater than the effective diameter of the workpiece.

8. The apparatus as claimed in claim 1, wherein each of said broaching tool comprises a plurality of broaching cutters mounted along the periphery of said tool and arranged one behind the other with each successive cutter offset from, and protruding outwardly more than, the preceding cutter so that said plurality of broaching cutters forms a spiral ascending in a direction of rotation of said broaching tool.

* * * * *